US012568344B2

(12) United States Patent (10) Patent No.: US 12,568,344 B2
Balakrishnan et al. (45) Date of Patent: Mar. 3, 2026

(54) IDENTIFYING CORRELATED MOBILE COMPUTING DEVICES ASSOCIATED WITH A COMMON VEHICLE OR TRIP

(71) Applicant: Cambridge Mobile Telematics Inc., Cambridge, MA (US)

(72) Inventors: Hari Balakrishnan, Belmont, MA (US); Samuel Madden, Newton, MA (US); Cesar Dante Maiorino, Watertown, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 376 days.

(21) Appl. No.: 18/126,130

(22) Filed: Mar. 24, 2023

(65) Prior Publication Data

US 2024/0114319 A1 Apr. 4, 2024

Related U.S. Application Data

(60) Provisional application No. 63/411,896, filed on Sep. 30, 2022.

(51) Int. Cl.
*H04W 4/029* (2018.01)
*H04W 4/38* (2018.01)
(52) U.S. Cl.
CPC ............. *H04W 4/029* (2018.02); *H04W 4/38* (2018.02)
(58) Field of Classification Search
None
See application file for complete search history.

(56) References Cited

U.S. PATENT DOCUMENTS 8,761,821 B2 * 6/2014 Tibbitts ................... H04W 4/48
455/515
9,900,747 B1 2/2018 Park
(Continued)

FOREIGN PATENT DOCUMENTS

EP 3823321 5/2021
EP 3744601 B1 4/2024
(Continued)

OTHER PUBLICATIONS

U.S. Appl. No. 13/832,456, filed Mar. 15, 2013, Girod et al.
(Continued)

*Primary Examiner* — Adolf Dsouza
(74) *Attorney, Agent, or Firm* — Kilpatrick Townsend & Stockton LLP

(57) ABSTRACT

Techniques for determining which mobile computing devices are traveling together in the same vehicle during one or more trips are disclosed. An example method includes determining, based on data received from one or more first sensors associated with a first mobile computing device, that the first mobile computing device is on a trip in a vehicle, broadcasting, by the first mobile computing device, a signal indicating that the first mobile computing device is on the trip in the vehicle, receiving, by at least one second mobile computing device, the signal being broadcasted from the first mobile computing device, determining that the second mobile computing device is in the same vehicle as the first mobile computing device, and in response to the determination, causing the second mobile computing device to cease collection of data from one or more second sensors associated with the second mobile computing device.

20 Claims, 6 Drawing Sheets

(56) References Cited

U.S. PATENT DOCUMENTS

| | | | | |
|---|---|---|---|---|
| 10,445,451 | B2 | 10/2019 | Fleming et al. | |
| 10,759,441 | B1 | 9/2020 | Balakrishnan et al. | |
| 2013/0274955 | A1* | 10/2013 | Rosenbaum ......... | G07C 5/0808 |
| | | | | 701/1 |
| 2014/0365803 | A1* | 12/2014 | Pham ..................... | G06F 3/017 |
| | | | | 713/324 |
| 2015/0312655 | A1 | 10/2015 | Balakrishnan et al. | |
| 2021/0144526 | A1* | 5/2021 | Zilberman .............. | H04W 4/80 |

FOREIGN PATENT DOCUMENTS

| | | | |
|---|---|---|---|
| EP | 3507787 | B1 | 8/2024 |
| EP | 4005252 | B1 | 1/2025 |
| EP | 3588373 | B1 | 6/2025 |

OTHER PUBLICATIONS

U.S. Appl. No. 14/529,812, filed Oct. 31, 2014, Balakrishnan et al.
Extended European Search Report in European Appln. No. 23197444.
5, mailed on Feb. 5, 2024, 10 pages.
EP23197444.5, "Intention to Grant", Aug. 28, 2025, 7 pages.

* cited by examiner

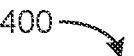

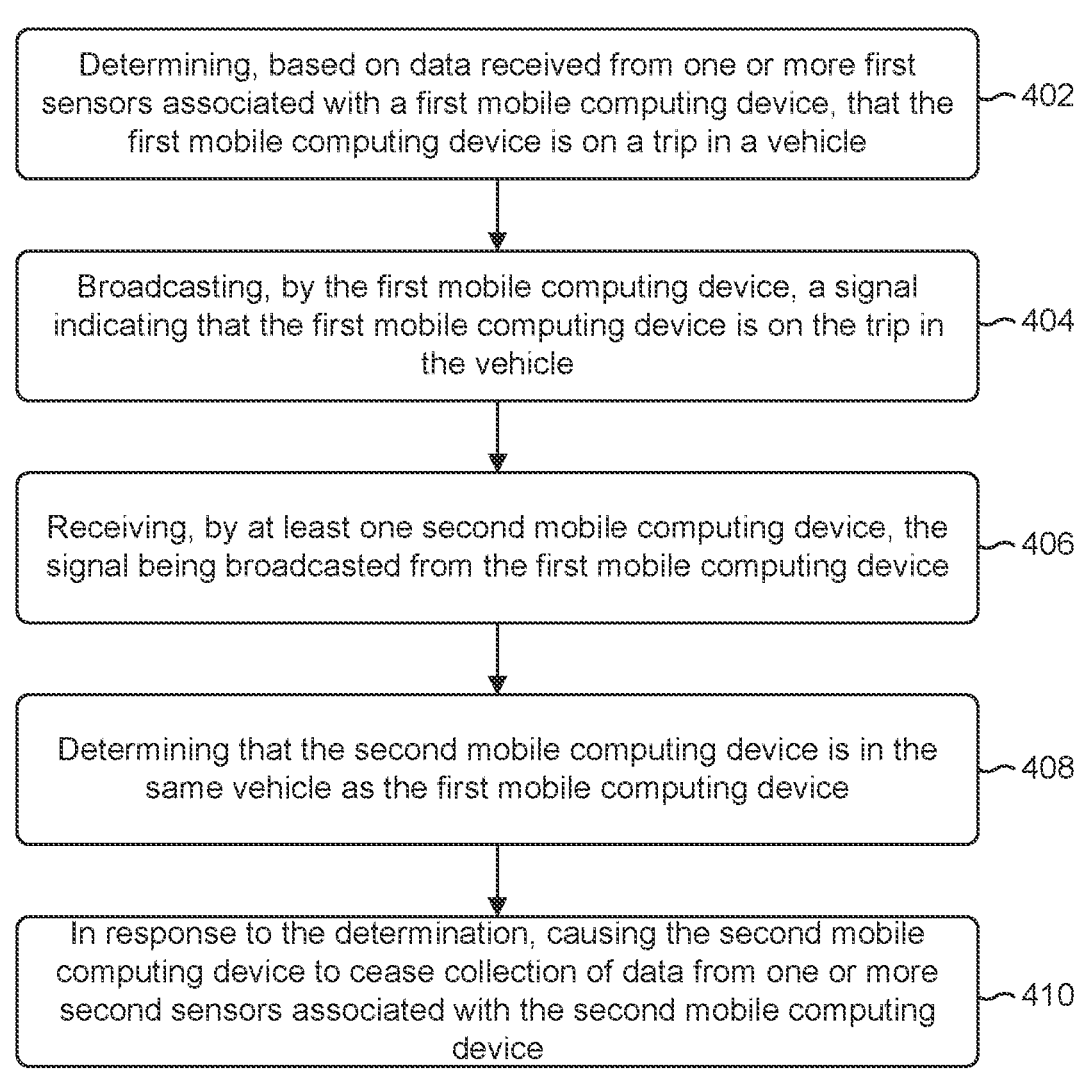

400

| Determining, based on data received from one or more first sensors associated with a first mobile computing device, that the first mobile computing device is on a trip in a vehicle | 402 |

Broadcasting, by the first mobile computing device, a signal indicating that the first mobile computing device is on the trip in the vehicle — 404

Receiving, by at least one second mobile computing device, the signal being broadcasted from the first mobile computing device — 406

Determining that the second mobile computing device is in the same vehicle as the first mobile computing device — 408

In response to the determination, causing the second mobile computing device to cease collection of data from one or more second sensors associated with the second mobile computing device — 410

FIG. 4

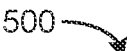

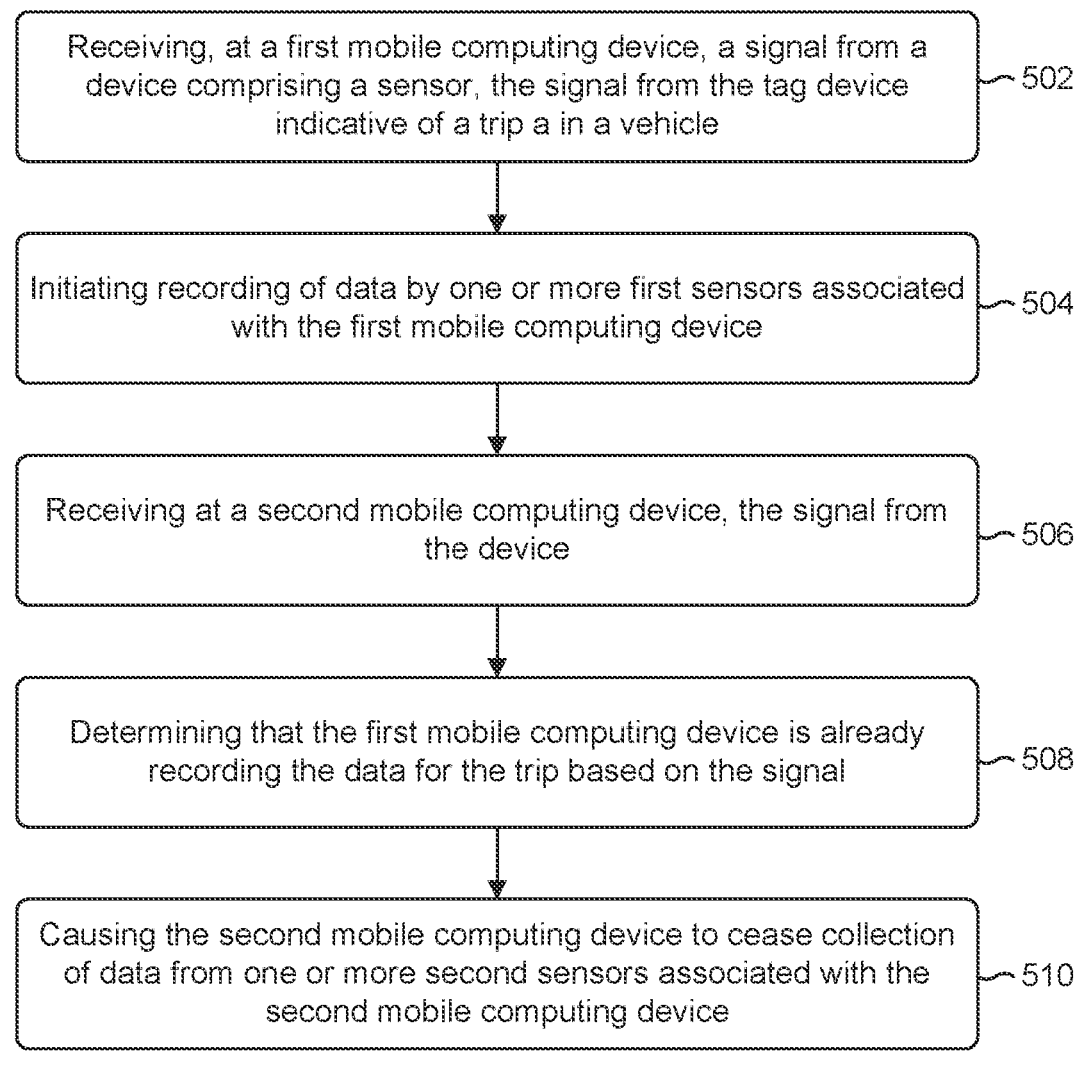

500

Receiving, at a first mobile computing device, a signal from a device comprising a sensor, the signal from the tag device indicative of a trip a in a vehicle — 502

Initiating recording of data by one or more first sensors associated with the first mobile computing device — 504

Receiving at a second mobile computing device, the signal from the device — 506

Determining that the first mobile computing device is already recording the data for the trip based on the signal — 508

Causing the second mobile computing device to cease collection of data from one or more second sensors associated with the second mobile computing device — 510

FIG. 5

IDENTIFYING CORRELATED MOBILE COMPUTING DEVICES ASSOCIATED WITH A COMMON VEHICLE OR TRIP

CROSS-REFERENCE TO RELATED APPLICATIONS

This application claims priority to and the benefit of U.S. Provisional Patent Application No. 63/411,896, filed Sep. 30, 2022, the entire content of which is incorporated herein by reference.

TECHNICAL FIELD

This disclosure relates generally to techniques for correlating mobile data processing devices, such as mobile phones. More specifically, this disclosure describes a method for determining that two or more mobile devices are correlated based on telematics data obtained by each of the two or more mobile devices to determine, for example, if they are in the same vehicle on a trip or set of trips.

BACKGROUND

Telematics applications are configured for collecting, storing, and processing data from sensors in vehicles. In particular, mobile telematics (also known as "smartphone telematics") applications are configured to execute software on mobile devices. The applications are configured to collect, store, and process data from built-in or external sensors of a mobile device, such as a smartphone.

SUMMARY

This specification describes methods and systems configured to determine which mobile computing devices (e.g., mobile phones) are traveling together in the same vehicle on one or more trips, as defined and further described below. Generally, the determination that two or more mobile computing devices are associated with a common trip (or a common vehicle) is performed by software running on the mobile computing devices (e.g., respective instances of telematics applications executing on the mobile computing devices), by a remote computing device (e.g., a server) that receives telematics data from the mobile computing devices executing respective telematics applications, or by a combination of these scenarios.

The data processing systems and methods described herein are configured to identify which of the mobile computing devices is associated with a driver of the common vehicle (if applicable) and which mobile computing devices are associated with passenger(s) in the vehicle. From the set of devices associated with the common vehicle or trip, the data processing system is configured to determine that at most one of the mobile computing devices belongs to the driver. The data processing system could reduce the recording (e.g., collection and/or saving as described below) of telematics data on one or more of the mobile devices, and subsequently use telematics data from other device(s) on the common trip or vehicle to infer the movement pattern of the mobile device that reduced its own recording. The reduction in telematics data recording reduces battery drain computation, storage, and network resources on one or more of the mobile computing devices associated with the common vehicle or trip, reduces a type and/or amount of sensor data recorded by the mobile computing devices. It may provide a visual representation of the trip for presentation on the mobile computing devices associated with the trip or common vehicle. It may provide data to measure the performance of the driver and/or vehicle for us in applications such as insurance pricing or driver/vehicle performance monitoring. In some embodiments, data recorded by one or more of the mobile computing devices is augmented or supplemented by additional data from additional devices (e.g., electronic IoT devices such as the DriveWell™ Tag or OBD-II devices) that are configured to send the additional data to the mobile computing devices using local communication links, such as Bluetooth, Wi-Fi, or other wireless technologies. The additional data can be specialized data (e.g., collected from a particular sensor such as a GPS sensor, accelerometer, etc.) that is sent to the mobile computing devices to augment the telematics data of those mobile computing devices.

In general, in a first aspect, a method for identifying correlated mobile computing devices associated with a common vehicle or trip includes: determining, based on data received from one or more first sensors associated with a first mobile computing device, that the first mobile computing device is on a trip in a vehicle; broadcasting, by the first mobile computing device, a signal indicating that the first mobile computing device is on the trip in the vehicle; receiving, by at least one second mobile computing device, the signal being broadcasted from the first mobile computing device; determining that the second mobile computing device is in the same vehicle as the first mobile computing device; and in response to the determination, causing the second mobile computing device to cease collection of data from one or more second sensors associated with the second mobile computing device.

In a second aspect combinable with the first aspect, the method includes determining that the trip in the vehicle has ended, and causing the first mobile computing device to cease broadcasting the signal.

In a third aspect combinable with the first or second aspects, the second mobile computing device is configured to resume collecting telematics data from the one or more second sensors in response to determining that the trip associated with the second mobile computing device is still in progress.

In a fourth aspect combinable with any of the first through third aspects, the second mobile computing device is associated with at least two sensors, and in which causing the second mobile computing device to cease collection of data includes allowing at least one sensor of the at least two sensors to continue to collect data.

In a fifth aspect combinable with any of the first through fourth aspects, the one or more second sensors associated with the second mobile computing device include at least a location sensor and an accelerometer, and causing the second mobile computing device to cease collection of data comprises causing the second mobile computing device to cease collection of data from the location sensor.

In a sixth aspect combinable with any of the first through fifth aspects, the method includes: determining that the first mobile computing device is a leader device; and determining that the second mobile computing device is a follower device, in which causing the second mobile computing device to cease collection of data is based on determining that the second mobile computing device is a follower device.

In a seventh aspect combinable with any of the first through sixth aspects, in which determining that the first mobile computing device is a leader device includes determining that the first mobile computing device is associated with the driver or a primary operator of the vehicle.

In an eighth aspect combinable with any of the first through seventh aspects, in which determining that the first mobile computing device is a leader device includes: determining the vehicle in which the data is being recorded; and determining that the first mobile computing device is associated with the driver or a primary operator of the vehicle.

In a ninth aspect combinable with any of the first through eighth aspects, determining the vehicle in which the data is being recorded includes receiving a signal from a computing device embedded in the vehicle.

In a tenth aspect combinable with any of the first through ninth aspects, determining the vehicle in which the data is being recorded includes receiving a signal from a computing device connected to the vehicle.

In an eleventh aspect combinable with any of the first through tenth aspects, determining the vehicle in which the data is being recorded includes receiving a signal from a computing device affixed to the vehicle.

In a twelfth aspect combinable with any of the first through eleventh aspects, the signal is broadcast over Bluetooth Low Energy (BLE), Wi-Fi, ultrasound, or sound by the first mobile computing device.

In a thirteenth aspect combinable with any of the first through twelfth aspects, the second mobile computing device is configured to receive a unique identifier associated with the first mobile computing device, and the second mobile computing device is configured to cease collecting data in response to determining that the unique identifier of the first mobile computing device represents a higher priority than another unique identifier associated with the second mobile computing device.

In a fourteenth aspect combinable with any of the first through thirteenth aspects, the signal includes one or more of a battery level and a rate of battery drain of the first computing device, and the second computing device compares one or more of its battery level and rate of battery drain with one or more of the battery level and the rate of battery drain of the first computing device and ceases collection based on the comparison.

In a fifteenth aspect combinable with any of the first through fourteenth aspects, the signal includes one or more of a make, a model, and an age of the first computing device, and the second computing device compares its one or more of its make, model, and age with one or more of the make, the model, and the age of the first computing device and ceases collection based on the comparison.

In a sixteenth aspect combinable with any of the first through fifteenth aspects, the method includes determining that the first mobile computing device is recording for a longer period of time than the second mobile computing device for the trip in the vehicle, in which the second mobile computing device is configured to cease collecting data in response to the determination.

In a seventeenth aspect combinable with any of the first through sixteenth aspects, the method includes: determining that the second mobile computing device is associated with the driver or a primary operator of the vehicle, and using the data received from the one or more sensors associated with the first mobile computing device to generate an assessment of the driver or the primary operator of the vehicle.

In an eighteenth aspect combinable with any of the first through seventeenth aspects, the method includes: determining that the second mobile computing device is associated with the driver or a primary operator of the vehicle; combining the data received from the one or more sensors associated with the first mobile computing device with data from the one or more second sensors associated with the second mobile computing device; and using the combined data to generate an assessment of the driver of the primary operator of the vehicle.

In general, in a nineteenth aspect, a method for identifying correlated mobile computing devices associated with a common vehicle or trip includes: receiving, at a first mobile computing device, a signal from a device comprising a sensor, the signal from the device indicative of a trip in a vehicle; initiating recording of data by one or more first sensors associated with the first mobile computing device; receiving, at a second mobile computing device, the signal from the device; determining that the first mobile computing device is already recording the data for the trip based on the signal; and causing the second mobile computing device to cease collection of data from one or more second sensors associated with the second mobile computing device.

In general, in a twentieth aspect, a method for identifying correlated mobile computing devices associated with a common vehicle or trip includes: determining, based on data received from one or more first sensors associated with a first mobile computing device, that the first mobile computing device is on a trip in a vehicle; broadcasting, by the first mobile computing device, a signal indicating that the first mobile computing device is on the trip in the vehicle; receiving, by at least one second mobile computing device, the signal being broadcasted from the first mobile computing device; causing the second mobile computing device to perform collection of data from one or more second sensors associated with the second mobile computing device to generate additional data for the trip; determining, based on the data from the first mobile computing device and the additional data from the second mobile computing device, that the first mobile computing device is associated with the driver or a primary operator of the vehicle; and in response to determining that the first mobile computing device is associated with the driver or the primary operator of the vehicle, causing the second mobile computing device to cease collection of data from the one or more second sensors associated with the second mobile computing device for the trip.

In general, in a twenty-first aspect, a device includes at least one processor and at least one storage device storing instructions executable by the at least one processor to perform the method of any of the first through twentieth aspects.

In general, in a twenty-second aspect, a system includes at least one processor and at least one storage device storing instructions executable by the at least one processor to perform the method of any of the first through twentieth aspects.

In general, in a twenty-third aspect, a non-transitory computer-readable medium stores instructions executable by at least one processor to perform the method of any of the first through twentieth aspects.

The embodiments and implementations of the methods and systems described herein enable one or more of the following advantages.

The system is configured to correlate one or more mobile devices as being associated with a common vehicle. As a result, one set of telematics data are representative of the operation of that common vehicle. The system is configured to cause one or more mobile devices to reduce or eliminate data collection for a telematics application associated with the mobile device. The reduced or eliminated data collection can enable reduced battery consumption on those mobile devices. Additionally, reduced or eliminated data collection can reduce a bandwidth usage for reporting data from the mobile device to a server system or remote data processing system.

The telematics application can generate a visual representation of the route or trip of the vehicle and each mobile device associated with the common vehicle. The application generates a related operation score for one or more devices associated with the common vehicle. The system (e.g., a remote data processing system) can cause respective instances of the application to each generate a respective score or representation or cause a subset (e.g., one) of the of the instances of the application to generate a score or visual representation, either for sending to the data processing system or to the other mobile devices.

Generally, at most one of the mobile devices that are associated with a common vehicle corresponds to a driver or operator of that common vehicle. The data processing system can improve a role classifier that specifies whether a user of a particular mobile device is operating a vehicle (such as a car, bicycle, motorcycle, truck, etc.) or whether the user of the mobile device is a passenger or a non-operator of the vehicle (such as for a train, bus, car, truck, etc.). The role classifier is described in further detail with respect to U.S. Pat. No. 9,900,747, titled "Using Telematics Data to Identify a Type of a Trip," and filed on May 16, 2017, the contents of which are incorporated by reference in entirety.

Additionally, the data processing system (e.g., a remote server or one of the mobile devices executing the telematics application) can be configured to execute one or more algorithms configured to detect or determine events associated with the operation of the common vehicle. For example, these events can include an orientation algorithm and event extraction algorithm for identifying braking, acceleration, distraction, and/or cornering events related to operation of the vehicle. These algorithms are further described in U.S. Pat. No. 10,759,441, titled Determining, Scoring, And Reporting Mobile Phone Distraction of a Driver and filed on May 6, 2019 and incorporated by reference in entirety herein. The telematics data, such as the accelerometer and/or global positioning system (GPS) data, from multiple devices in the same vehicle improves detection of the operation events for that vehicle by enabling cross-correlation analysis of the telematics data.

Additionally, the data processing system, by having data indicating that a plurality of mobile devices are associated with a common vehicle (e.g., on a same trip or parts of trips) allow enables instances of the telematics application on respective mobile devices to cause those respective mobile devices to display data to the user indicating the other users/devices that are or were associated with the same vehicle, trip, or portion of the trip. The data can inform the user of associated mobile devices and/or users, enable the user to communicate or contact the mobile devices of those users, or otherwise interact with the other mobile devices and/or users.

The details of one or more implementations are set forth in the accompanying drawings and the description below. The techniques described here can be implemented by one or more systems, devices, methods, or non-transitory computer-readable media, among others. Other features and advantages will be apparent from the description and drawings, and from the claims.

6

Figure 1:
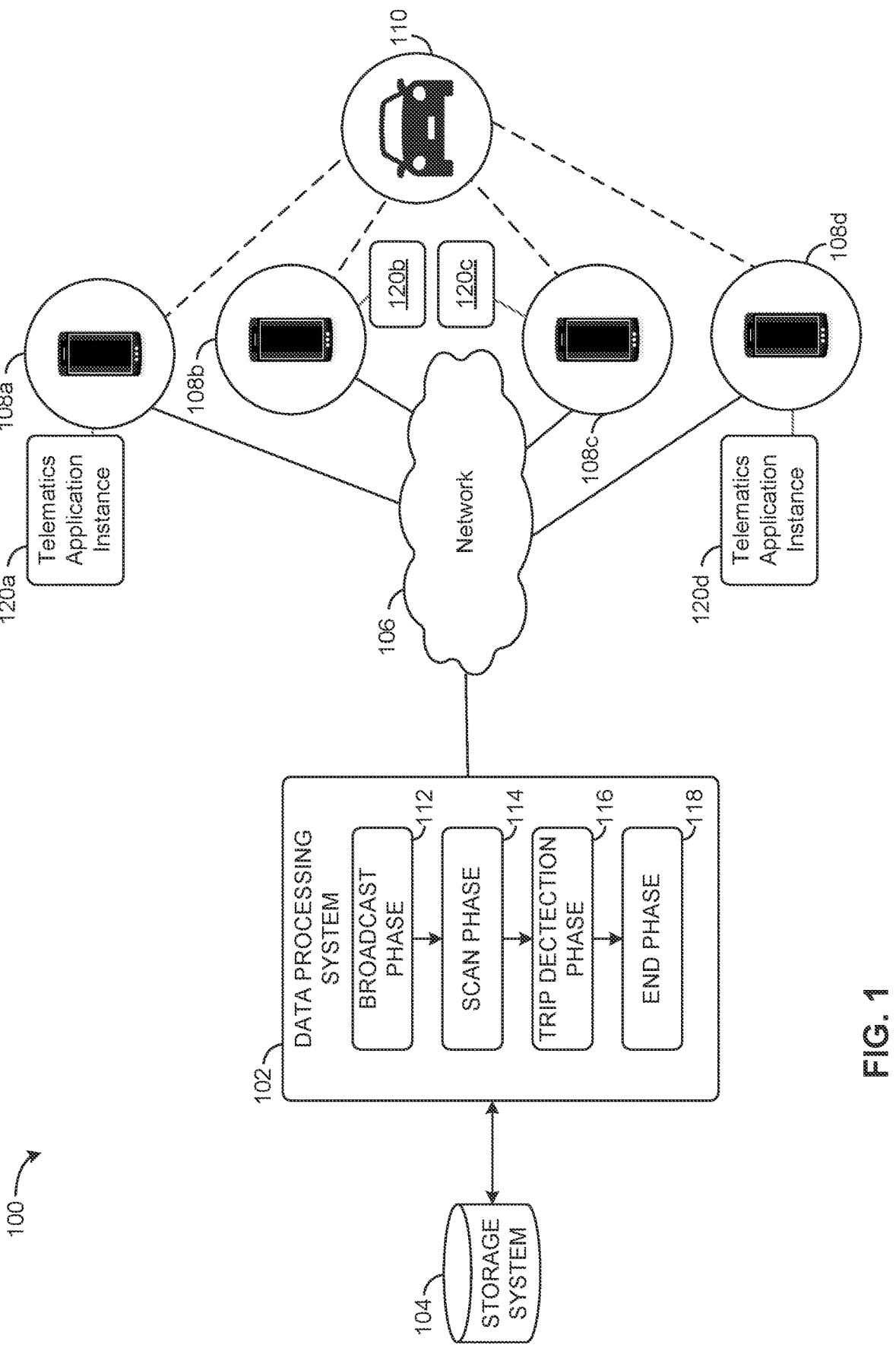
FIG. 1 illustrates an example system for identifying correlated mobile computing devices that are associated with a common vehicle or trip.
Figure 2:
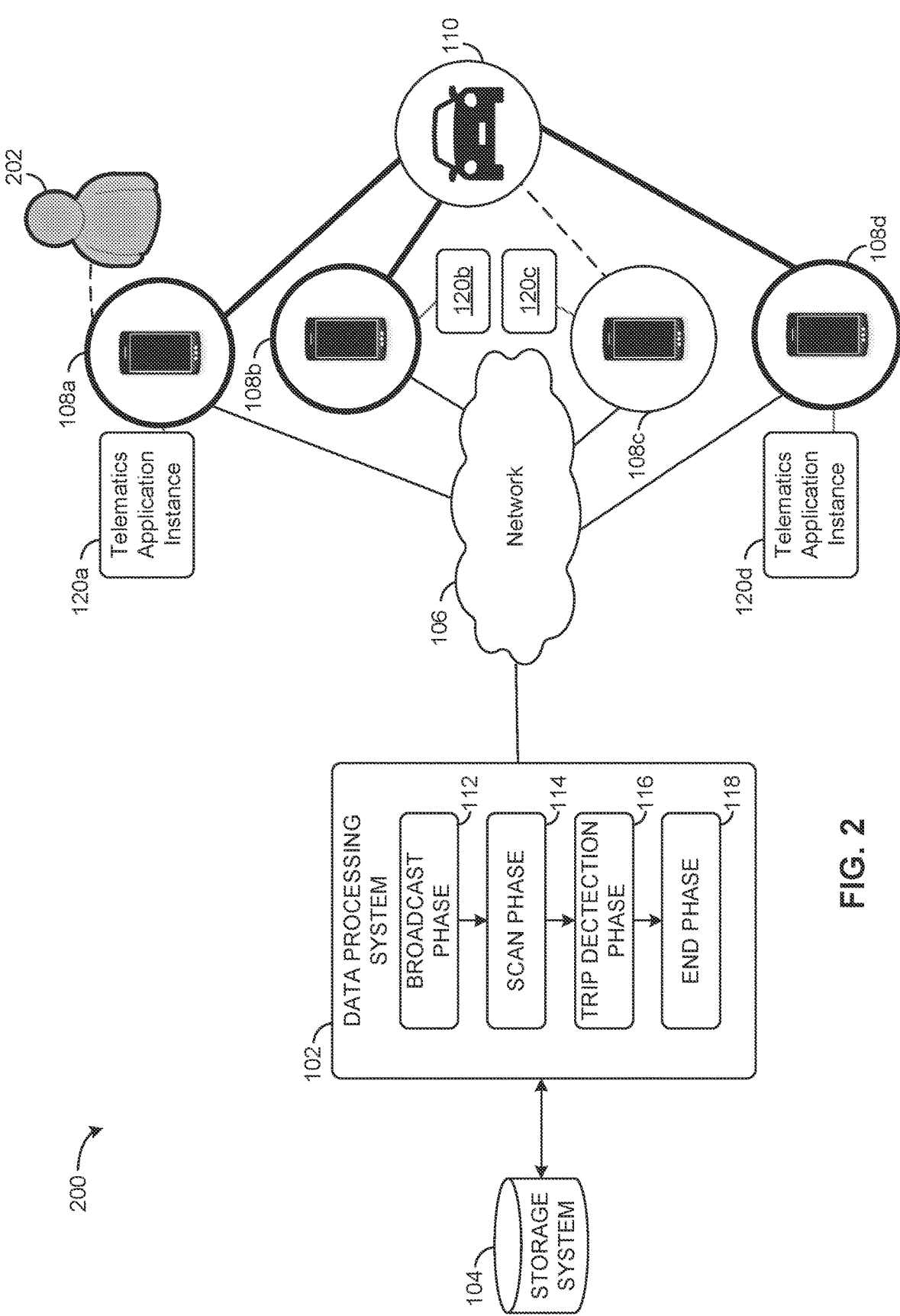

FIG. 2 illustrates an example of the system of FIG. 1 having identified correlated mobile computing devices.

Figure 3:
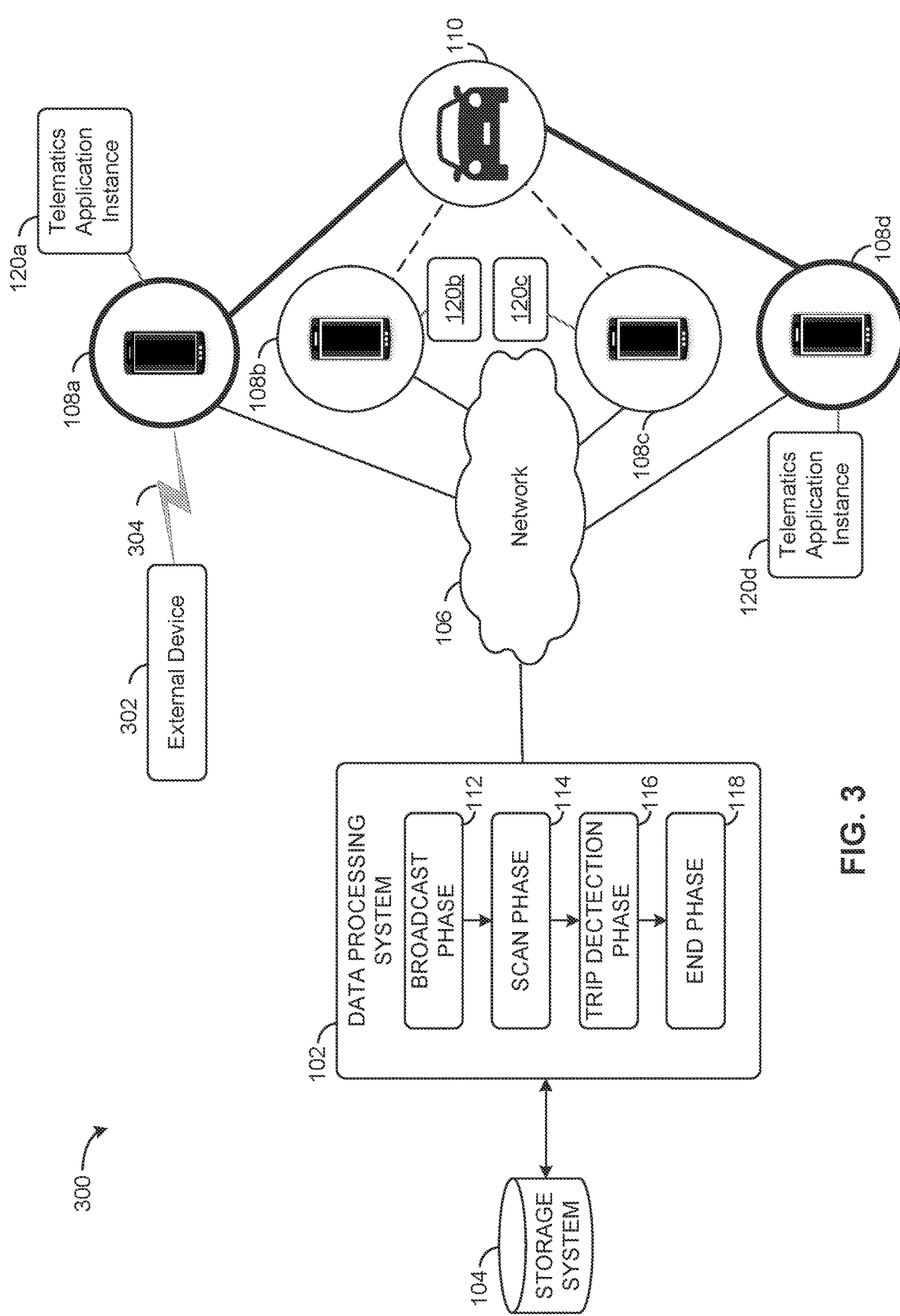

FIG. 3 illustrates an example system for identifying correlated mobile computing devices that are associated with a common vehicle or trip.

FIGS. 4 and 5 illustrate example processes.

Figure 6:
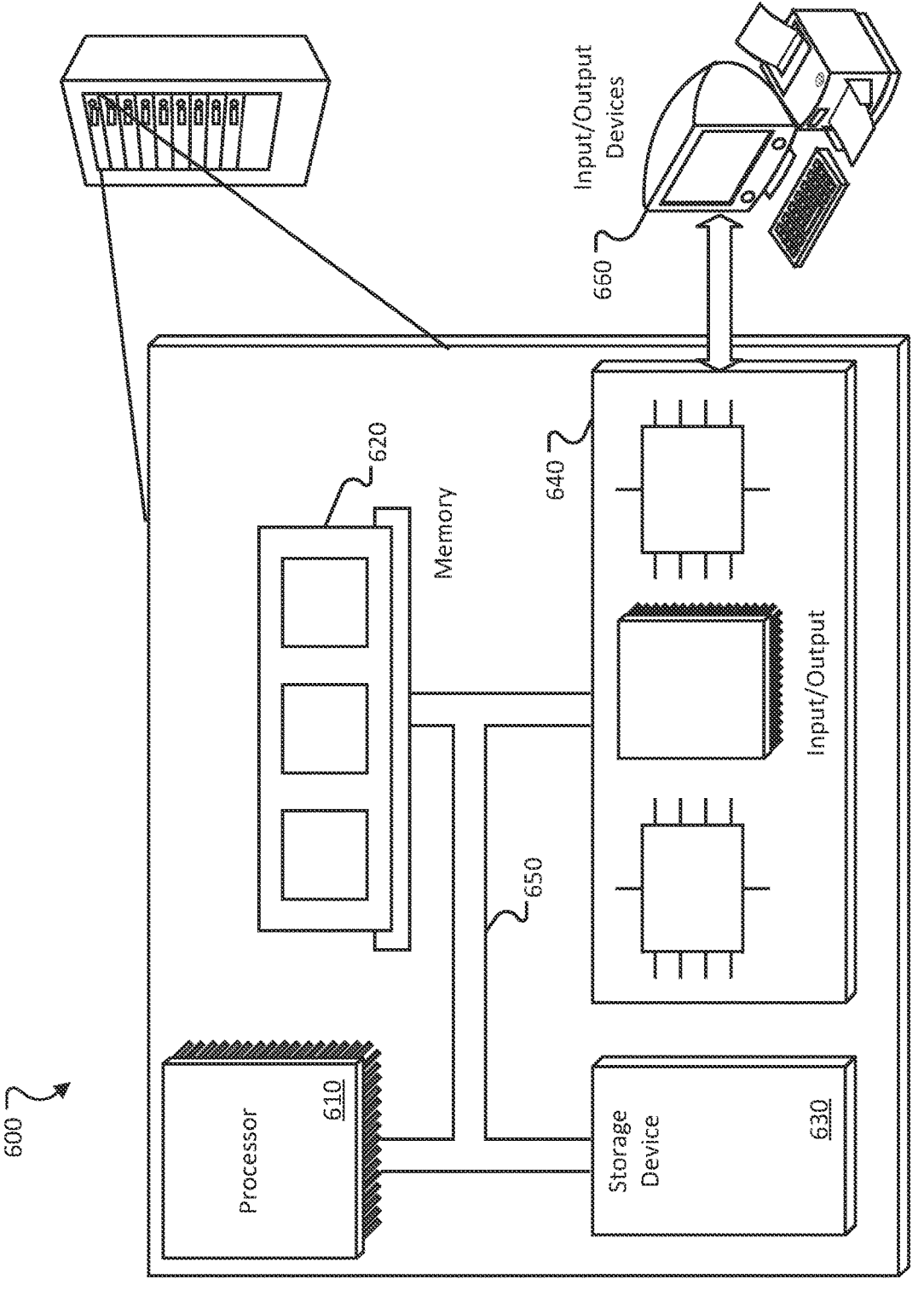

FIG. 6 illustrates an example computer system.

Like reference symbols in the various drawings indicate like elements.

DETAILED DESCRIPTION

FIG. 1 shows an environment 100 including a data processing system 102 configured to determine which mobile computing devices 108a, 108b, 108c, 108d (e.g., mobile phones) are associated with are associated with one another and/or a common vehicle 110 such that the mobile computing devices are associated with a common trip (e.g., in the vehicle 110), and therefore, which data recorded by mobile computing devices 108a-d are related or redundant.

The environment 100 includes data processing system 102, a storage system 104, a network 106, a plurality of mobile computing devices 108a, 108b, 108c, 108d, and a vehicle 110. The storage system 104 includes one or more computer-readable storage mediums configured to receive and store data for identifying correlated mobile computing devices 108a-d associated with a common vehicle 110 or trip of the vehicle.

A trip can include, for example, any instance of travel from an origin place to a destination place. In some cases, a trip is such an instance involving a single transportation mode (e.g., a car) or a single role of a person being transported (e.g., a driver) or both. For example, a trip may include an instance of travel from a house to a grocery store in a car in which the user of a mobile device from which a recording is captured is a driver of the car.

Generally, recording data (e.g., by the mobile computing devices) refers broadly to include, for example, any collected, assembled, organized, stored, or accumulated set, sequence, or series of data items that together relate to, capture, involve, or reflect an episode, event, or other occurrence associated with travel or transportation. In particular, a recording may be associated with or represent one or more trips, and one or more recordings can be associated with a single trip.

A transportation mode may include, for example, any form, conveyance, or manner of travel, such as car, bus, truck, train, boat, bicycle, motorcycle, pedestrian (walking or running), off-road vehicle, or airplane, among others.

A role may include a person being transported broadly to include, for example, any class, category, or type of activity, such as, passenger, driver, occupant, patron, or rider, and so forth.

A vehicle 110 can include a car, bus, train, motorcycle, mobile home, truck, or any such similar machines configured to transport users of the mobile computing devices 108a-d. Generally, a vehicle 110 is associated with not more than one driver. However, a driver need not be associated with any of the mobile computing devices 108a-d.

In some implementations, the mobile computing devices 108-c can include one or more sensors including accelerometers, gyroscopes, global navigation satellite systems (GNSS), image sensors, audio sensors, etc. configured to collect telematics data for transmission to the storage system 104. In some examples, mobile computing devices 108a-d are telematics devices that are brought into the vehicle. The mobile computing devices 108a-d, can each include one of a smartphone, tablet, or wearable device that is brought into the vehicle 110. In some examples, the mobile computing devices 108*a-d* are associated with a separate telematics device (sometimes referred to as a tag device) that is placed or affixed in (but not necessarily electrically connected to) the vehicle 110, such as tag device of the kind described in U.S. patent application Ser. No. 14/529,812, titled "System and Method of Obtaining Vehicle Telematics data," the entire contents of which is incorporated herein by reference. The telematics data may be further processed, possible in conjunction with additional data, to provide further features. An example is found in U.S. patent application Ser. No. 13/832,456, titled "Inference of vehicular trajectory characteristics with personal mobile devices," the entire contents of which is incorporated herein by reference. In some examples, the claims data and observed feature data are linked to one another through, for example, a unique identifier for a user. In some examples, the mobile computing devices 108*a-d* are associated with a separate telematics devices such as an OBD-II device or may obtain data via a wireless or wired connection from the vehicle's in-built telematics unit.

Generally, mobile computing devices can include, for example, any kind of equipment that can be carried by a user without requiring wired connection to a communication link and is subject to being used, while a user is driving, in a way that can cause distraction of the user from the driving. Mobile devices include mobile phones and smartphones, for example.

In the existing system, users install a mobile telematics application (app) instance on one of the mobile computing devices 108*a-d* and drive with it. The app runs in the background, automatically detecting the start and stop of each trip using information from location and mobile phone activity APIs provided by the phone's operating system, in some cases augmented with information from the inertial sensors on the phone; or, using wireless signals from an in-vehicle device such as the tag device from Cambridge Mobile Telematics (described in described in U.S. patent application Ser. No. 14/529,812 and incorporated here by reference) or a wireless signal from the vehicle itself. The mobile app then gathers sensor data from the movement sensors, including position sensors, accelerometer, and gyroscope when the user (of the phone) is driving. This sensor data may be analyzed and initially processed on the mobile phone, then sent to servers in the "cloud" via a wireless network (e.g., Wi-Fi, cellular, or any other network providing connectivity to the servers). At the cloud servers, a telematics engine processes the stream of sensor data from the mobile computing devices 108*a-d* to accurately estimate both the dynamics of the vehicle and the movement patterns of the mobile computing device within the vehicle 110. These computations could be run on the mobile computing device itself without the data being sent to cloud servers (e.g., the data processing system 102 is hosted on one or more of the mobile computing devices 108*a-d*).

A trip can be considered to be of a type in the sense that it can involve a transportation mode, or a role, or both, or can involve other classifications or categories associated with the trip, for example, business commuting versus pleasure, rush hour versus off hour, active passenger versus passive passenger.

Generally, the determination that two or more mobile computing devices are associated with a common trip (or a common vehicle) is performed by software running on the mobile computing devices 108*a-d* (e.g., respective instances of telematics applications executing on the mobile computing devices), by a remote computing device (e.g., a server) that receives telematics data from the mobile computing devices executing respective telematics applications, or by a combination of these scenarios. The data processing system 102 can be implemented on any of the mobile computing devices 108*a-d* (e.g., associated with one or more of the telematics application instances) or on the remote server.

The data processing system 102 and methods described herein are configured to identify which of the mobile computing devices 108*a-d* is associated with a driver of the common vehicle 110 (if applicable) and which mobile computing devices are associated with passenger(s) using the vehicle. From the set of devices associated with the common vehicle or trip, the data processing system 102 is configured to determine that at most one of the mobile computing devices belongs to the driver.

As previously described, the data processing system 102 reduces recording (e.g., collection and/or saving as described below) of telematics data from the mobile computing devices 108*a-d*. The reduction in telematics data recording mitigates battery drain on one or more of the mobile computing devices 108*a-d* associated with the common vehicle 110 or trip, reduces a type and/or amount of sensor data recorded by the mobile computing devices. The system may provide a visual representation of the trip for presentation on the mobile computing devices associated with the trip or common vehicle.

In some embodiments, data recorded by one or more of the mobile computing devices is augmented or supplemented by additional data from additional devices (e.g., electronic devices) that are configured to send the additional data to the mobile computing devices using local communication links, such as Bluetooth, Wi-Fi, or other technologies. The additional data can be specialized data (e.g., collected from a particular sensor such as a GPS sensor, accelerometer, etc.) that is sent to the mobile computing devices to augment the telematics data of those mobile computing devices.

The mobile telematics application executing on one or more of mobile computing devices 108*a-d* may evaluate application rules to determine when to collect sensor data from sensors of the respective mobile computing devices. A common mode of operation is to collect sensor data from one or more of the accelerometer, gyroscope, magnetometer, location (position, velocity), and barometer, among others, whenever the mobile computing devices 108*a-d* associated with the sensor is determined to be moving, determined to be associated with driving (for vehicular applications), or has undergone a significant change in location from a previous position. The application collects data from the sensors until the mobile device has come to rest for a certain amount of time or (for vehicular applications) when the driving is thought to have ended. The rest period here does not necessarily imply that the device has stopped moving, but that the activity has ended; for example, if the distance traversed by the device within the last few minutes is under a threshold, a drive is considered to have ended. If the device starts moving again, data collection will resume.

Each collected item of sensor data can be timestamped, and a sequence of such timestamped sensor data items is sometimes called a recording. A common approach is to collect sensor data items continuously during a period. In this example, the data processing system 102 segments sequences of the collected data according to a rule (e.g., sequences that are separated by certain periods of rest) to form multiple recordings. Eventually, multiple consecutive recordings may be treated as separate trips, or may be merged into a single one based on various conditions. A single recording may also be segmented into multiple distinct trip segments.

In some cases, an instance of a mobile application executing on one of the mobile computing devices 108a-d generates recordings and determines when a given recording starts and when the given recording ends. A recording can be started and stopped for a variety of reasons by a mobile application automatically without user input. The application executes in a background without a user visiting the application on the mobile computing device 108a-d. For example, the recording may start or stop when a time period elapses, an event or interrupt occurs, specific data values are recorded, and so forth. For example, a recording end when there are specific activities occurring, such as movement faster than a certain speed or a significant change in location from a previously known position. The recording may also be started and stopped manually by providing suitable user-interface options to the user (e.g., the person engaged in the travel). A person who is a driver or passenger or otherwise involved in a trip can be called a participant. A user can include a person who uses or is associated with a particular smartphone or other mobile computing device 108a-d and sometimes as a participant in a trip. A user can be both the participant in a trip and a person who was associated with a particular mobile computing device 108a0d that was used in or carried by the participant during a trip.

The telematics application instances of the mobile computing devices 108a-d are configured to evaluating driving quality by analyzing the recorded sensor data for speeding, hard braking, harsh acceleration, phone distraction, and other features indicative of risky driving. When used to measure driver behavior, the telematics application is configured to identify the role of the person associated (e.g., owning or possessing) the mobile computing device 108 that is doing the recording, and specifically whether they are driving. As described in U.S. Pat. No. 9,900,747, incorporated herein in entirety by reference, describes how to identify the type of a trip using telematics data.

Mobile telematics applications executing on the mobile computing devices 108a-d can operate in two example configurations. A first configured includes an application-only configuration. In this first configuration, trips are detected and recorded by software running on the mobile computing devices 108a-d using information only from phone sensors. A second configuration includes an application plus tag application (app+tag). In the second configuration, an external device to the mobile computing devices 108a-d and in communication with the mobile computing devices is configured to collect data using its own sensors (e.g., accelerometers, GPS devices, etc.). The external devices can include short-range wireless devices (e.g., Bluetooth Low Energy, or BLE), which can augment the sensors of the mobile computing devices 108a-d. App+tag programs are described in U.S. patent application Ser. No. 14/529,812, incorporated in entirety by reference herein.

For app+tag programs, the external tag device beacons on a radio channel (e.g., BLE) when the vehicle is determined to be moving. Software on a mobile computing device 108 in the vehicle receives a signal of the beacon and attempts to connect with the tag. In some implementations, if a connection is successful, the telematics application starts recording data and receives acceleration data streamed from the tag and augments this data with its own data. In app+tag programs, if the tag can support only one active connection, and if multiple mobile computing devices 108a-d are present in the vehicle on a given trip, only one of the mobile computing devices records trip data. The other phones can also record some or all of the sensor data, or subsequently infer that the phones were on the same trip for display to the user. This inference allows users to see every trip they have taken, help insurers obtain information about all the trips taken by a phone, and be used to determine whether a user was a driver or a passenger on the trip.

As previously described, the data processing system 102 is configured to operate in each of app-only and app+tag configurations with some differences in operation, as now described. In a broadcast phase 112, each of the mobile computing devices 108a-d that is recording a trip broadcasts a signal, such as a Bluetooth low energy (BLE) advertisement (beacon), a Wi-Fi signal, an ultrasound signal, a sound signal, or the like, periodically (e.g., using in-built operating system application programming interfaces (APIs)) stating that it is on a trip (e.g., signaling ON_A_TRIP). In the scenario of a tag-based application, the advertisement could be done by the tag device (e.g., external device 302 of FIG. 3). The tag device enables only one mobile computing device 108 to connect to it (e.g., device 108a as shown in FIG. 3). In some implementations, the other devices 108a-c do not record any data, reducing bandwidth usage and processing burden. The other mobile computing devices 108b-d are devices that can receive this additional advertisement (whether from the external device 302 or from another mobile computing device 108) and thus also start recording sensor data.

In a scan phase 114, each mobile computing device 108a-d also scans periodically using standard operating system APIs for the "ON_A_TRIP" BLE advertisement from any advertising (beaconing devices) in the vicinity.

On hearing any "ON_A_TRIP" advertisement, the listening device (a mobile computing device 108) is caused to perform one or more of the following operations. The mobile computing device is configured to initiate a BLE connection to the advertising device and retrieve information about the unique identity of the advertising device (e.g., MAC address or equivalent). The identifier data might be obtainable in the advertisement itself without connecting, but may also require a connection. On some operating systems, there are other ways to provide the information without requiring a connection, but connecting is a viable option providing the ability to include more information about the advertising device.

In some implementations, one of the mobile computing devices 108a-d could determine to stop sensor data collection and store data indicating that that particular mobile computing device is on a trip with the advertising device. This configuration is performed using one or more leader-election protocols, such as the following. The mobile computing device can be selected corresponding to a smallest or largest identifier value (e.g., if numerical or alphabetical). The mobile computing device can be selected (e.g., by the data processing system 102) which has been recording for a longer period of time on the current trip. The data processing system 102 can select the mobile computing device of mobile computing devices 108a-d that is known to belong to the driver or primary operator of the vehicle, if known. This can occur for application+tag scenarios. For instance, the vehicle in which data is being recorded can be determined based on, for example, a signal received from a computing device embedded in the vehicle, a signal received from a computing device connected to the vehicle, or a signal received from a computing device affixed to the vehicle, among others. The mobile computing device associated with the driver or primary operator of the vehicle can then be selected as the leader (and the mobile computing device(s) not associated with the driver or primary operator of the vehicle can be selected as follower(s)).

In some implementations, a signal (e.g., the signal broadcast by the mobile computing devices 108a-d) can include an indication of one or more of a battery level and a rate of battery drain of the respective mobile computing device. The mobile device(s) receiving the signal can compare one or more of its own battery level and rate of battery drain with one or more of the received battery level and the rate of battery drain and can cease (or continue) collection of data based on the comparison. For example, if the mobile device determines from the comparison that its battery level is lower and/or its rate of battery drain is greater than that of the mobile device broadcasting the signal, then the mobile device can cease collection of data.

In some implementations, a signal (e.g., the signal broadcast by the mobile computing devices 108a-d) can include an indication of one or more of a make, model, and age (e.g., time from date of manufacture to present) of the respective mobile computing device. The mobile device(s) receiving the signal can compare one or more of its own make, model, and age with one or more of the received make, model, and age and can cease (or continue) collection of data based on the comparison. For example, if the mobile device determines from the comparison that its age is greater and/or its make or model is less preferred (e.g., according to a predetermined preference list managed by the system) than that of the mobile device broadcasting the signal, then the mobile device can cease collection of data.

In some implementations, one of the mobile computing devices 108a-d is configured to stop sensor data collection of a subset of sensors. For example, a given mobile computing device 108 can be controlled to stop collecting data from a battery-intensive location sensor (such as a GPS sensor). Data from other sensors, such as less battery intensive sensors (e.g., an accelerometer, gyroscope, etc.), and other data (e.g., screen orientation or status) are still collected. This enables the data processing system 102 to determine a phone distraction status or classification if it is later determined that the particular mobile computing device that is suppressing full sensor data collection actually belonged to the driver on the given trip.

If more than two mobile computing devices 108a-d are in the vehicle 110, any subset of those mobile computing devices can be configured (e.g., by the data processing system 102) to be in a "no data collection" or "partial data collection" mode for the duration of the trip. The leader election process includes selecting one of the mobile computing devices 108a-d to perform full collection (or lead in the collection of data) and for the others to be followers performing full, partial, or no collection of data.

The data processing system 102 is configured to control the mobile computing devices 108a-d operation during the trip. In a trip detection phase 116, when the "ON_A_TRIP" beacon advertisement is no longer received by one or more of the mobile computing devices 108a-d, but a particular mobile computing device that was previously hearing the advertisement determines that a trip is still occurring for that mobile computing device, the particular mobile computing device activates full data collection if it was previously in "no" or "partial" data collection operating mode.

Generally, a mobile computing device 108a-d that is operating in a "partial" or "no" data collection mode executes the application instance 120 in a background state during a trip. In some implementations, the mobile computing device is configured to simply terminate the trip. The mobile computing device 108 is configured to awake periodically, if the trip continues, if the device is moving in a vehicle 110. For example, when a location, speed, or acceleration of the mobile computing device 108 changes above a threshold level (e.g., X miles since the last check, Y miles per hour, Z meters per second). In another example, if in-built activity sensors of a particular mobile computing device 108 or associated vehicle provide data that indicate that driving may be occurring, the associated mobile computing device(s) may be configured to awaken periodically.

In an end phase 118, the data processing system 102 determines that a given trip has ended. The "ON_A_TRIP" beacon ceases advertising the trip state. A trip can be considered ended when movement is no longer detected by any of the associated mobile computing devices 108a-d. In some implementations, a sensor associated with the vehicle 110 may indicate to the data processing system 102 that a trip has ended. For example, if the vehicle is powered down, an engine is turned off, one or more of the devices 108a-d moves away from a location of other mobile computing devices 108a-d on the trip or from the vehicle, etc. the data processing system 102 can determine that the trip has ended.

FIG. 2 shows an example environment 200 including the data processing system 102 of FIG. 1. In FIG. 2, a user 202 is determined to be a driver of the vehicle 110. The data processing system 102 is configured to determine that the user 202 is associated with a particular mobile computing device 108a.

In this example, mobile computing devices 108a, 108b, and 108d receive the "ON_A_TRIP" beacon advertised from one of the other mobile computing devices (e.g., device 108a associated with driver 202). Mobile computing device 102c does not receive the advertisement of the beacon. As a result, after a leader-follower process is performed (as previously described), the mobile computing devices 108b and 108d are determined by the data processing system 102 to be followers of leader mobile computing device 108a associated with driver 202. The mobile computing devices 108b and 108d cease collecting telematics data for the duration of the ride.

In the example of FIG. 2, the mobile computing devices 108a, 108b, and 108d are in a vehicle 110, such as a car. The mobile computing device 102c is not in the vehicle, as has not received the "ON_A_TRIP" beacon. The mobile computing device 102c continues to collect telematics data on a respective instance 120c of a telematics application, while follower mobile computing devices 108b and 108d cease collection of telematics data using their respective telematics application instances 120c, 120d. The mobile computing device 108a collects telematics data (e.g., by respective telematics application instance 120a) representing the trip for all three devices 108a, 108b, and 108d on the trip. If it is later determined that mobile computing device 108c is also on the same trip as the device 108a, 108b, and 108d, the mobile computing device 108c may also cease collection of telematics data for that trip.

In some implementations, one or more of the follower devices 108b or 108d (or both) continue to collect telematics data associated with the trip of mobile computing device 108a. This can be performed to obtain redundant data that can improve classification of a role of the devices or of one or more trip types, as previously described. In some implementations, once a role is assigned (e.g., that device 108a is associated with the driver 202), the follower devices (e.g., devices 108b and 108d) can cease collection of telematics data.

In some implementations, it is possible to combine data collected from multiple devices determined to be on a common trip to provide a complete view of the vehicle dynamics and mobile device interactions associated with each mobile device to users and/or to the server, even when any given device records only partial or no telematics data by itself. For example, if a mobile computing device is determined to be associated with a driver or primary operator of the vehicle (as described herein), data obtained from one or more sensors of another mobile computing device can be used to generate an assessment of the driver of the primary operator of the vehicle.

The device 108a in FIG. 2 is operating in the application only mode. No local devices (e.g., additional sensor devices) are included in the vehicle 110. In this example, mobile computing devices 108a, 108b, and 108d communicate directly with one another. The data processing system 102 can execute on any of the mobile computing devices 108a-d or on a remote server system, as previously described.

Turning to FIG. 3, an application+tag device scenario is shown. An external device 302, representing the tag previously described, is associated with one of the mobile computing devices 108a-d. In this example, the external device 302 is connected over a local network 304 to mobile computing device 108a. The local network 304 can be distinct from the general network 106, which represents telecommunications networks, the Internet, etc. The local network 304 includes Bluetooth, Wi-Fi, and so forth as previously described.

In the example of FIG. 3, the mobile computing device 108a is selected as the leader device by the data processing system 102 because the mobile computing device 108a indicates that it is connected (e.g., paired) with the external device 302. The application instance 120a executing on the mobile computing device 108a is configured to combine data from the telematics sensor(s) of the mobile computing device 108a and the sensor(s) of the external device 302 for telematics analysis. In this example, mobile computing device 108d receives the beacon and is also considered to be on the trip with mobile computing device 108a, and ceases collection of telematics data from its sensors. The devices 108b and 108c in this example are not considered on the trip with mobile computing devices 108a and 108d and continue to collect telematics data.

Referring to FIG. 4, an example process 400 for identifying correlated mobile computing devices that are associated with a common vehicle or trip is shown. In some implementations, the process 400 is performed by one or more of the components of FIGS. 1-3, such as the data processing system 102, one or more of the mobile devices 108a-d (and/or their associated tags), or combinations thereof. Operations of the process 400 include determining, based on data received from one or more first sensors associated with a first mobile computing device, that the first mobile computing device is on a trip in a vehicle (402). In response, the first mobile computing device broadcasts (or is caused to broadcast) a signal indicating that the first mobile computing device is on the trip in the vehicle (404). The signal being broadcast from the first mobile computing device is received by at least one second mobile computing device (406). A determination is made that the second mobile computing device is in the same vehicle as the first mobile computing device (408). In response to the determination, the second mobile computing device is caused to cease collection of telematics data from one or more second sensors associated with the second mobile computing device (410).

Referring to FIG. 5, an example process 500 for identifying correlated mobile computing devices that are associated with a common vehicle or trip is shown. In some implementations, the process 500 is performed by one or more of the components of FIGS. 1-3, such as the data processing system 102, one or more of the mobile devices 108a-d (and/or their associated tags), or combinations thereof. Operations of the process 500 include receiving, at a first mobile computing device, a signal from a device that includes at least one sensor (502). The signal from the device is indicative of a trip in a vehicle. In response to the signal, recording of data by one or more first sensors associated with the first mobile computing device is initiated (504). The signal from the device is received at a second mobile computing device (506). A determination is made that the first mobile computing device is already recording the data for the trip based on the signal (508). In response, the second mobile computing device is caused to cease collection of data from one or more second sensors associated with the second mobile computing device (510).

FIG. 6 is a block diagram of an example computer system 600. For example, referring to FIG. 1, the data processing system 102 could be an example of the system 600 described here, as could the mobile computing devices 108a-d used by any of the users who access resources of these components. The system 600 includes a processor 610, a memory 620, a storage device 630, and one or more input/output interface devices 640. Each of the components 610, 620, 630, and 640 can be interconnected, for example, using a system bus 650.

The processor 610 is capable of processing instructions for execution within the system 600. The term "execution" as used here refers to a technique in which program code causes a processor to carry out one or more processor instructions. In some implementations, the processor 610 is a single-threaded processor. In some implementations, the processor 610 is a multi-threaded processor. The processor 610 is capable of processing instructions stored in the memory 620 or on the storage device 630. The processor 610 may execute operations such as those described with reference to FIGS. 4-5.

The memory 620 stores information within the system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 can include, for example, a hard disk device, an optical disk device, a solid-state drive, a flash drive, magnetic tape, or some other large capacity storage device. In some implementations, the storage device 630 may be a cloud storage device, e.g., a logical storage device including one or more physical storage devices distributed on a network and accessed using a network. In some examples, the storage device may store long-term data. The input/output interface devices 640 provide input/output operations for the system 600. In some implementations, the input/output interface devices 640 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 600 to communicate, for example, transmit and receive data. In some implementations, the input/output device can include driver devices configured to receive input data and send output data to other input/output devices, e.g., keyboard, printer and display devices 660. In some implementations, mobile computing devices, mobile communication devices, and other devices can be used.

A server, such as the data processing system 62 shown in FIG. 1, can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 600 is contained within a single integrated circuit package. A system 600 of this kind, in which both a processor 610 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 640.

Although an example processing system has been described in FIG. 6, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

What is claimed is:

1. A computer-implemented method, comprising:

determining, based on data received from one or more first sensors associated with a first mobile computing device, that the first mobile computing device is on a trip in a vehicle;

responsive to determining the first mobile computing device is on the trip in the vehicle, broadcasting, by the first mobile computing device, a signal indicating that the first mobile computing device is on the trip in the vehicle, wherein the signal is broadcast using a wireless communication protocol;

receiving, by at least one second mobile computing device, the signal being broadcasted from the first mobile computing device;

determining that the second mobile computing device is in the same vehicle as the first mobile computing device; and in response to the determination, causing the second mobile computing device to cease collection of data from one or more second sensors associated with the second mobile computing device.

2. The computer-implemented method of claim 1, further comprising:

determining that the trip in the vehicle has ended; and causing the first mobile computing device to cease broadcasting the signal.

3. The computer-implemented method of claim 2, wherein the second mobile computing device is configured to resume collecting data from the one or more second sensors in response to determining that the trip associated with the second mobile computing device is still in progress.

4. The computer-implemented method of claim 1, wherein the second mobile computing device is associated with at least two sensors, and wherein causing the second mobile computing device to cease collection of data comprises allowing at least one sensor of the at least two sensors to continue to collect data.

5. The computer-implemented method of claim 1, wherein the one or more second sensors associated with the second mobile computing device comprise at least a location sensor and an accelerometer, and wherein causing the second mobile computing device to cease collection of data comprises causing the second mobile computing device to cease collection of data from the location sensor.

6. The computer-implemented method of claim 1, further comprising:

determining that the first mobile computing device is a leader device; and determining that the second mobile computing device is a follower device, wherein causing the second mobile computing device to cease collection of data is based on determining that the second mobile computing device is a follower device.

7. The computer-implemented method of claim 6, wherein determining that the first mobile computing device is a leader device comprises determining that the first mobile computing device is associated with a driver or a primary operator of the vehicle.

8. The computer-implemented method of claim 6, wherein determining that the first mobile computing device is a leader device comprises:

determining the vehicle in which the data is being recorded; and determining that the first mobile computing device is associated with the driver or a primary operator of the vehicle.

9. The computer-implemented method of claim 8, wherein determining the vehicle in which the data is being recorded comprises receiving a signal from a computing device embedded in the vehicle.

10. The computer-implemented method of claim 8, wherein determining the vehicle in which the data is being recorded comprises receiving a signal from a computing device connected to the vehicle.

11. The computer-implemented method of claim 8, wherein determining the vehicle in which the data is being recorded comprises receiving a signal from a computing device affixed to the vehicle.

12. The computer-implemented method of claim 1, wherein the wireless communication protocol is based on Bluetooth Low Energy (BLE) or Wi-Fi.

13. The computer-implemented method of claim 1, wherein the second mobile computing device is configured to receive a unique identifier associated with the first mobile computing device, and wherein the second mobile computing device is configured to cease collecting data in response to determining that the unique identifier of the first mobile computing device represents a higher priority than another unique identifier associated with the second mobile computing device.

14. The computer-implemented method of claim 1, wherein the signal includes one or more of a battery level and a rate of battery drain of the first mobile computing device, and wherein the second mobile computing device compares one or more of its battery level and rate of battery drain with the one or more of the battery level and the rate of battery drain of the first mobile computing device and ceases collection based on the comparison.

15. The computer-implemented method of claim 1, wherein the signal includes one or more of a make, a model, and an age of the first mobile computing device, and wherein the second mobile computing device compares one or more of its make, model, and age with the one or more of the make, the model, and the age of the first mobile computing device and ceases collection based on the comparison.

16. The computer-implemented method of claim 1, further comprising:
  determining that the first mobile computing device is recording for a longer period of time than the second mobile computing device for the trip in the vehicle; and
  wherein the second mobile computing device is configured to cease collecting data in response to the determination.

17. The computer-implemented method of claim 1, further comprising:
  determining that the second mobile computing device is associated with a driver or a primary operator of the vehicle; and
  using the data received from the one or more first sensors associated with the first mobile computing device to generate an assessment of the driver or the primary operator of the vehicle.

18. The computer-implemented method of claim 1, further comprising:
  determining that the second mobile computing device is associated with a driver or a primary operator of the vehicle;
  combining the data received from the one or more first sensors associated with the first mobile computing device with data from the one or more second sensors associated with the second mobile computing device; and
  using the combined data to generate an assessment of the driver of the primary operator of the vehicle.

19. A computer-implemented method, comprising:
  receiving, at a first mobile computing device, a signal from a device comprising a sensor, the signal from the device indicative of a trip in a vehicle;
  initiating recording of data by one or more first sensors associated with the first mobile computing device;
  receiving, at a second mobile computing device, the signal from the device, wherein the signal is broadcast using a wireless communication protocol;
  determining that the first mobile computing device is already recording the data for the trip based on the signal; and
  causing the second mobile computing device to cease collection of data from one or more second sensors associated with the second mobile computing device.

20. A computer-implemented method, comprising:
  determining, based on data received from one or more first sensors associated with a first mobile computing device, that the first mobile computing device is on a trip in a vehicle;
  responsive to determining the first mobile computing device is on the trip in the vehicle, broadcasting, by the first mobile computing device, a signal indicating that the first mobile computing device is on the trip in the vehicle, wherein the signal is broadcast using a wireless communication protocol;
  receiving, by at least one second mobile computing device, the signal being broadcasted from the first mobile computing device;
  causing the second mobile computing device to perform collection of data from one or more second sensors associated with the second mobile computing device to generate additional data for the trip;
  determining, based on the data from the first mobile computing device and the additional data from the second mobile computing device, that the first mobile computing device is associated with a driver or a primary operator of the vehicle; and
  in response to determining that the first mobile computing device is associated with the driver or the primary operator of the vehicle, causing the second mobile computing device to cease collection of data from the one or more second sensors associated with the second mobile computing device for the trip.

* * * * *